US012213523B2

(12) United States Patent
Wang et al.

(10) Patent No.: US 12,213,523 B2
(45) Date of Patent: Feb. 4, 2025

(54) ELECTRONIC CIGARETTE ATOMIZER AND ELECTRONIC CIGARETTE COMPRISING SAME

(71) Applicant: SHENZHEN FIRST UNION TECHNOLOGY CO., LTD., Shenzhen (CN)

(72) Inventors: Qigen Wang, Shenzhen (CN); Desheng Huang, Shenzhen (CN); Zhengfa Li, Shenzhen (CN); Yonghai Li, Shenzhen (CN); Zhongli Xu, Shenzhen (CN)

(73) Assignee: SHENZHEN FIRST UNION TECHNOLOGY CO., LTD., Shenzhen (CN)

( * ) Notice: Subject to any disclaimer, the term of this patent is extended or adjusted under 35 U.S.C. 154(b) by 734 days.

(21) Appl. No.: 17/298,136

(22) PCT Filed: Nov. 6, 2019

(86) PCT No.: PCT/CN2019/116005
§ 371 (c)(1),
(2) Date: May 28, 2021

(87) PCT Pub. No.: WO2020/108258
PCT Pub. Date: Jun. 4, 2020

(65) Prior Publication Data

US 2021/0345670 A1 Nov. 11, 2021

(30) Foreign Application Priority Data

Nov. 29, 2018 (CN) ........................ 201821984847.8

(51) Int. Cl.
*A24F 40/44* (2020.01)
*A24F 40/10* (2020.01)
(Continued)

(52) U.S. Cl.
CPC .............. *A24F 40/44* (2020.01); *A24F 40/10* (2020.01); *A24F 40/42* (2020.01); *A24F 40/46* (2020.01);
(Continued)

(58) Field of Classification Search
CPC .......... A24F 40/10; A24F 40/42; A24F 40/44; A24F 40/46; H05B 2203/016; H05B 2203/021; H05B 3/06
See application file for complete search history.

(56) References Cited

U.S. PATENT DOCUMENTS 4,274,479 A * 6/1981 Eastman ............... F28D 15/046
29/890.032
10,172,393 B2 * 1/2019 Li ............................ H05B 3/42
(Continued)

FOREIGN PATENT DOCUMENTS

CN 204273236 U 4/2015
CN 105294140 A 2/2016
(Continued)

*Primary Examiner* — Abdullah A Riyami
*Assistant Examiner* — Thang H Nguyen
(74) *Attorney, Agent, or Firm* — Proi Intellectual Property US

(57) ABSTRACT

An electronic cigarette atomizer, comprising an electronic cigarette liquid storage chamber for storing electronic cigarette liquid, and an atomization assembly for absorbing and atomizing the electronic cigarette liquid. The atomization assembly comprises a porous body and a heating element. The porous body comprises an electronic cigarette liquid absorption surface in contact with the electronic cigarette liquid and an atomization surface. The heating element is provided on the atomization surface. The electronic cigarette liquid absorption surface is provided with a plurality of blind holes and/or grooves extending along the electronic cigarette liquid absorption surface towards the atomization surface. In
(Continued)

the atomization assembly, electronic cigarette liquid atomization is performed on the porous body formed with the blind holes and/or grooves.

19 Claims, 9 Drawing Sheets

(51) Int. Cl.
*A24F 40/42* (2020.01)
*A24F 40/46* (2020.01)
*H05B 3/06* (2006.01)

(52) U.S. Cl.
CPC ......... *H05B 3/06* (2013.01); *H05B 2203/016* (2013.01); *H05B 2203/021* (2013.01)

(56) References Cited

U.S. PATENT DOCUMENTS

| | | | | |
|---|---|---|---|---|
| 10,226,076 | B2 * | 3/2019 | Althorpe | A24F 40/40 |
| 2016/0000146 | A1 * | 1/2016 | Zhu | A24F 40/46 392/404 |
| 2017/0188626 | A1 * | 7/2017 | Davis | A24F 40/40 |
| 2017/0215481 | A1 * | 8/2017 | Li | H05B 3/42 |
| 2017/0367402 | A1 * | 12/2017 | Lau | A61M 11/042 |
| 2019/0246692 | A1 * | 8/2019 | Li | A24F 1/00 |
| 2019/0350256 | A1 * | 11/2019 | Hejazi | A24F 40/44 |
| 2020/0367564 | A1 * | 11/2020 | Li | A24F 40/44 |

FOREIGN PATENT DOCUMENTS

| | | | | |
|---|---|---|---|---|
| CN | 105747278 | A | 7/2016 | |
| CN | 105996131 | A | 10/2016 | |
| CN | 208064478 | U | 11/2018 | |
| CN | 209376696 | U | 9/2019 | |
| EP | 3469928 | A1 | 4/2019 | |
| EP | 3479706 | A1 | 5/2019 | |
| WO | 2016154792 | A1 | 10/2016 | |
| WO | WO-2018001105 | A1 * | 1/2018 | A24F 40/05 |
| WO | 2018032671 | A1 | 2/2018 | |
| WO | WO-2023174054 | A1 * | 9/2023 | A24F 40/10 |

* cited by examiner

ELECTRONIC CIGARETTE ATOMIZER AND ELECTRONIC CIGARETTE COMPRISING SAME

The present invention claims priority to Chinese Patent Application No. 201821984847.8, filed on Nov. 29, 2018 in China National Intellectual Property Administration and entitled "Electronic Cigarette Atomizer and Electronic Cigarette Comprising Same", which is hereby incorporated by reference in its entirety.

TECHNICAL FIELD

The embodiments of the present invention relate to the technical field of electronic cigarettes, in particular, an electronic cigarette atomizer and an electronic cigarette comprising same.

BACKGROUND

A core component of an electronic cigarette product is an atomizer that evaporates electronic cigarette liquid to generate electronic cigarette liquid aerosol. The function of the atomizer is mainly realized based on an atomization assembly; the atomization assembly has a porous body for absorbing and conducting the electronic cigarette liquid, and a heating element provided on the porous body and used for evaporating and atomizing the electronic cigarette liquid absorbed and conducted by the porous body. The porous body is a component with capillary pores inside, which can perform infiltration absorption and conduction through the internal pores; and the heating element has a heat generation unit for heating and a conductive pin part. The heat generation unit is used for heating and evaporating the electronic cigarette liquid conducted by the porous body to form the electronic cigarette liquid aerosol for smoking.

The service life and atomization efficiency of the atomizer are mainly determined by the quality and performance of the porous body; the porous body made of third-generation alumina or diatomaceous earth is usually obtained by mixing a ceramic precursor material with a porogen, etc., and sintering the mixture (such as the preparation technology for porous ceramic proposed by Macwelch in Patent No. 201410268630.7); and the prepared porous body has a large number of random micropores, so as to realize electronic cigarette liquid absorption and conduction. There are some shortcomings in the use of this type of porous body: On the one hand, when an original ceramic material before sintering is uniformly mixed in slurry, a pore former is randomly arranged in the slurry during mixing, finally resulting in that the shapes and directions of the pores inside the sintered porous body are also irregularly arranged, so that a conduction path of the electronic cigarette liquid is composed of a number of pores that are connected in a curved manner, and the path length is much longer than a linear distance from an electronic cigarette liquid absorption surface of the porous body to an electronic cigarette liquid atomization surface, thereby reducing the conduction and atomization efficiency of the electronic cigarette liquid. On the other hand, when the electronic cigarette liquid transfer efficiency of the porous body is improved by adding more pore formers to ceramic powder before sintering, the mechanical strength of the porous body will be insufficient, which easily causes crushing or powder falling in subsequent installation and use. Therefore, the performance of the porous body is limited.

SUMMARY

In order to solve the problem that an atomizer with an atomization assembly is restricted in the electronic cigarette liquid conduction efficiency in the existing technology, the embodiments of the present invention provide an electronic cigarette atomizer with sufficient electronic cigarette liquid conduction and atomization efficiency.

The electronic cigarette atomizer of the embodiments of the present invention includes an electronic cigarette liquid storage chamber for storing electronic cigarette liquid, and an atomization assembly for absorbing the electronic cigarette liquid from the electronic cigarette liquid storage chamber and atomizing the electronic cigarette liquid. The atomization assembly includes a porous body for conducting the electronic cigarette liquid, and a heating element for atomizing the electronic cigarette liquid. The porous body includes an electronic cigarette liquid absorption surface in contact with the electronic cigarette liquid and an atomization surface. The heating element is provided on the atomization surface. The electronic cigarette liquid absorption surface is provided with a plurality of blind holes and/or grooves extending along the electronic cigarette liquid absorption surface towards the atomization surface.

Preferably, an aperture of each blind hole is 50 to 500 μm; and/or, a width of each groove is 50 to 500 μm.

Preferably, a depth of each blind hole and/or groove is less than 0.8 times of a distance from the electronic cigarette liquid absorption surface to the atomization surface.

Preferably, the heating element includes a heat generation unit for generating heat and an electrode connection unit provided on the heat generation unit;

the electronic cigarette liquid absorption surface includes a first electronic cigarette liquid absorption region opposite to the heat generation unit, and a second electronic cigarette liquid absorption region opposite to the electrode connection unit;

a density of the blind holes in the first electronic cigarette liquid absorption region is greater than a density of the blind holes in the second electronic cigarette liquid absorption region; and/or, a density of the grooves in the first electronic cigarette liquid absorption region is greater than a density of the grooves in the second electronic cigarette liquid absorption region.

Preferably, the blind holes and/or the grooves are uniformly arranged in the electronic cigarette liquid absorption surface.

Preferably, the sectional areas of the blind holes gradually decrease along an extending direction of the blind holes;

and/or, the sectional areas of the grooves gradually decrease along an extending direction of the grooves.

Preferably, a hole pitch between adjacent blind holes in the electronic cigarette liquid absorption surface is 0.1 to 1 mm.

Preferably, a pore aperture of the porous body is 0.1 to 200 μm, with a porosity of 0 to 80%.

The present invention further provides an electronic cigarette product using the above electronic cigarette atomizer. Specifically, the electronic cigarette product includes an atomization device for atomizing electronic cigarette liquid to generate aerosol, and a power supply device for supplying power to the atomizer. The atomization device uses the foregoing electronic cigarette atomizer.

According to the electronic cigarette atomizer of the present invention, in the atomization assembly, electronic cigarette liquid atomization is performed on the porous body formed with the blind holes by means of laser tapping, mechanical perforating, and other approaches. The porous body has larger specific surface area, which enhances the electronic cigarette liquid adsorption and storage capability and improves the amount of smoke and the smoke efficiency. Moreover, the strength requirement is also achieved, and the service life is longer.

The present invention further provides a method for preparing a large number of atomization assemblies in the above electronic cigarette atomizer at one time. The method includes the following steps:

obtaining a porous body having an electronic cigarette liquid absorption surface and an atomization surface;

forming, in the electronic cigarette liquid absorption surface, the blind holes and/or grooves that extend along the electronic cigarette liquid absorption surface towards the atomization surface by means of laser tapping or mechanical perforating;

providing a template having hollowed-out patterns on the atomization surface, where the hollowed-out patterns match with the shape of the heating element;

taking a preparation material of the heating element as a target material, and depositing the target material on the atomization surface in a manner of magnetron sputtering or hot and cold spraying to generate a deposited layer; and removing the template to obtain the atomization assembly.

Preferably, the thickness of the deposited layer is 1 to 30 μm.

Preferably, the template is provided with a plurality of regularly arranged hollowed-out patterns.

Preferably, after the template removal step, the method further includes:

cutting the atomization assembly according to the arrangement manner of the hollowed-out patterns.

The above preparation method for the atomization assembly can realize batch preparation of the atomization assembly at one time. Furthermore, compared with a traditional mixing and sintering method, the preparation method, on the one hand, can ensure that all the prepared atomization assemblies have good electrical performance consistency. Moreover, the problem that it is difficult to realize mass production because a sintering process window for a heating material made of alloy slurry is narrow can be avoided.

BRIEF DESCRIPTION OF THE DRAWINGS

One or more embodiments are exemplified by the corresponding accompanying drawings. These exemplified descriptions do not constitute a limitation to the embodiments. Elements with the same reference numerals in the accompanying drawings are shown as similar elements. The drawings in the accompanying drawings do not constitute scaling restrictions unless otherwise stated.

DETAILED DESCRIPTION

In order to facilitate understanding of the present invention, the present invention is described in detail below in combination with the accompanying drawings and specific implementation modes.

Figure 1:
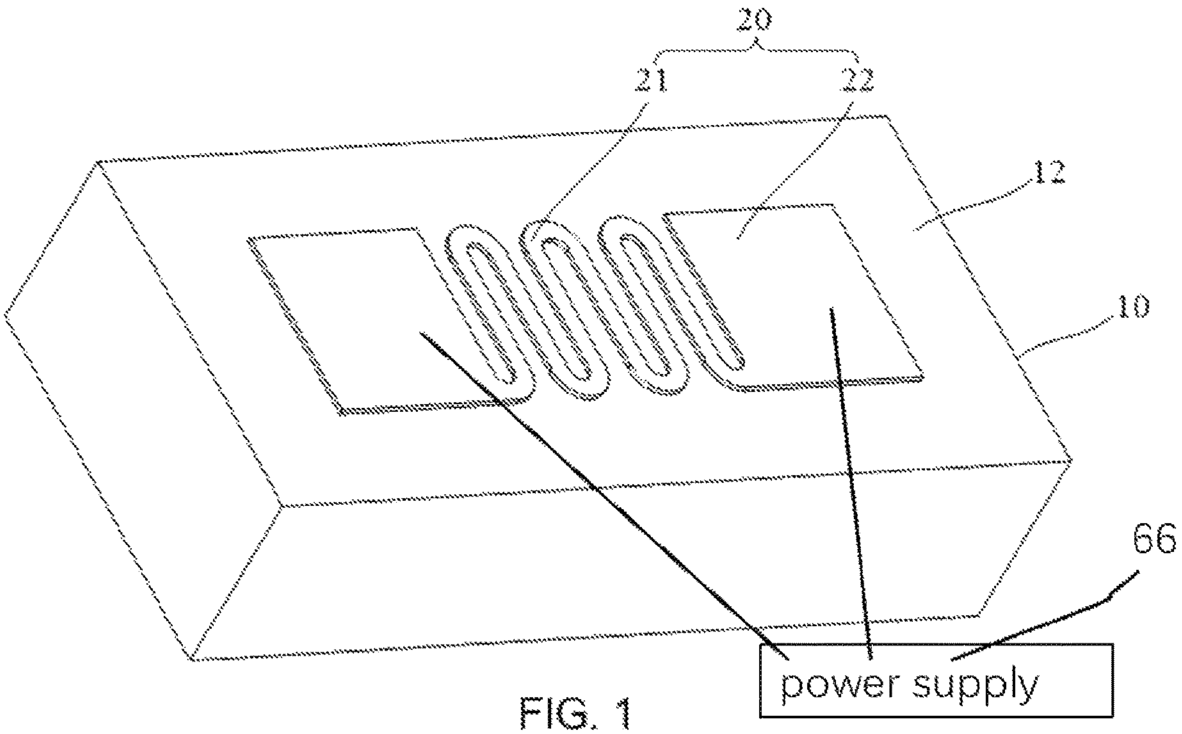
FIG. 1 is a schematic structural diagram of an atomization assembly of one embodiment at one visual angle.
Figure 2:
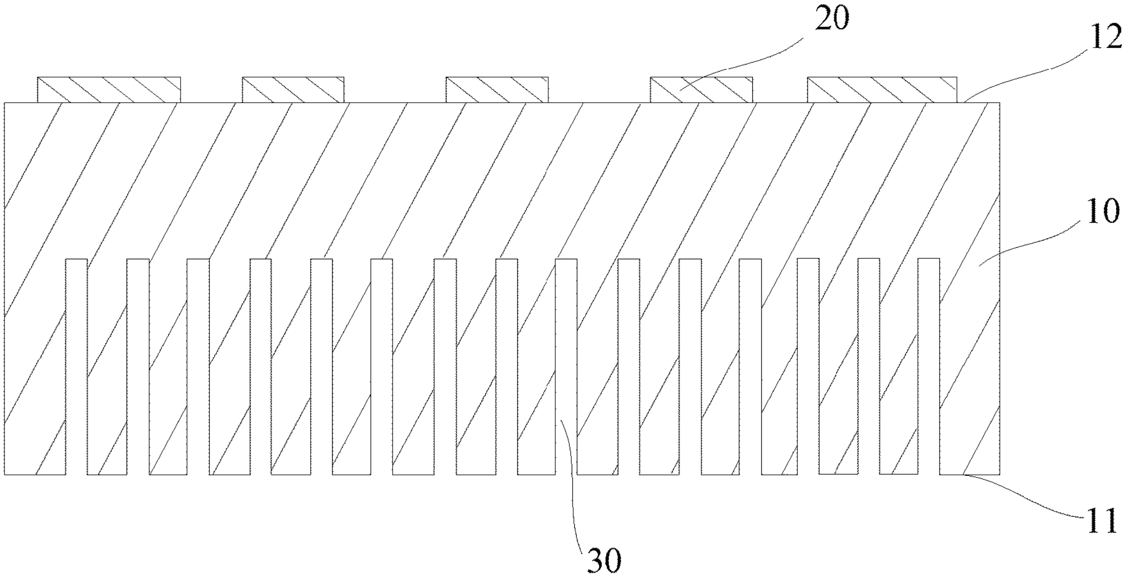
FIG. 2 is a schematic sectional structural diagram of the atomization assembly of the embodiment of FIG. 1.
Figure 3:
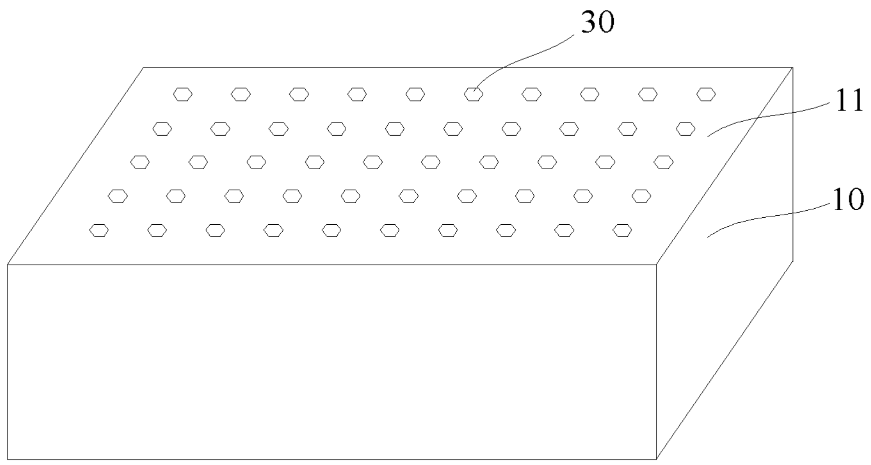
FIG. 3 is a schematic structural diagram of an atomization assembly of the embodiment of FIG. 1 at another visual angle.

The structure of an atomization assembly used in an electronic cigarette atomizer of the present invention in one embodiment can be as shown in FIG. 1 to FIG. 3. The atomization assembly includes a porous body 10 for absorbing electronic cigarette liquid, and a heating element 20 provided on the porous body and used for atomizing the electronic cigarette liquid to generate aerosol. Specifically, the heating element 20 includes a heat generation unit 21 for generating heat, and an electrode connection unit 22 provided on the heat generation unit 21. The electrode connection unit 22 is used for connecting the heat generation unit 21 to positive and negative electrodes of a power supply 66 of an electronic cigarette, so as to realize supplying power to the heating element 20.

The porous body 10 has at least one electronic cigarette liquid absorption surface 11 for being in contact with the electronic cigarette liquid and absorbing the electronic cigarette liquid, and at least one atomization surface 12 (the porous body 10 in the embodiment shown in FIG. 1 is of a blocky structure, and correspondingly, the upper and lower surfaces are respectively used as one group of electronic cigarette liquid absorption surface 11 and atomization surface 12). Moreover, a pore of the porous body 10 can be used for conducting the electronic cigarette liquid from the electronic cigarette liquid absorption surface 11 to the atomization surface 12. The heating element 20 is arranged on the atomization surface 12.

Further, in implementation, referring to the schematic sectional diagram shown in FIG. 2, the electronic cigarette liquid absorption surface 11 of the porous body 10 is provided with a plurality of blind holes 30 extending along the electronic cigarette liquid absorption surface 11 towards the atomization surface 12.

By means of the structure of the blind holes 30, on one hand, the specific surface area when the electronic cigarette liquid absorption surface 11 is in contact with the electronic cigarette liquid can be enlarged, so that the contact with the electronic cigarette liquid and the absorption efficiency are greatly improved. Moreover, the blind holes 30 are opened along the electronic cigarette liquid absorption surface 11 towards the atomization surface 12, which can be used for linearly conducting the electronic cigarette liquid to reduce the conduction distance caused by a curved path of the pores and improve the conduction efficiency.

Figure 5:
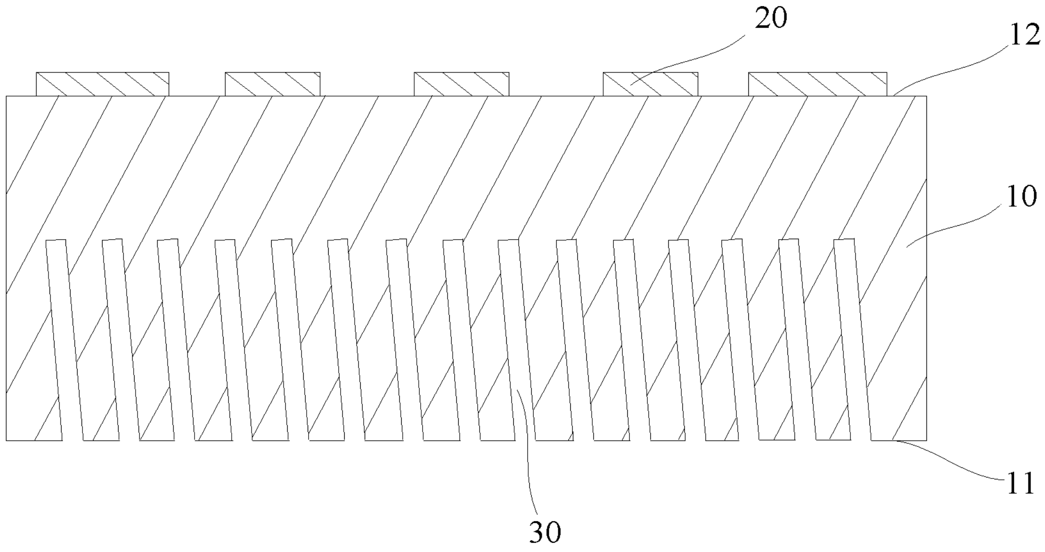
FIG. 5 is a schematic sectional structural diagram of the atomization assembly of another embodiment.
Figure 6:
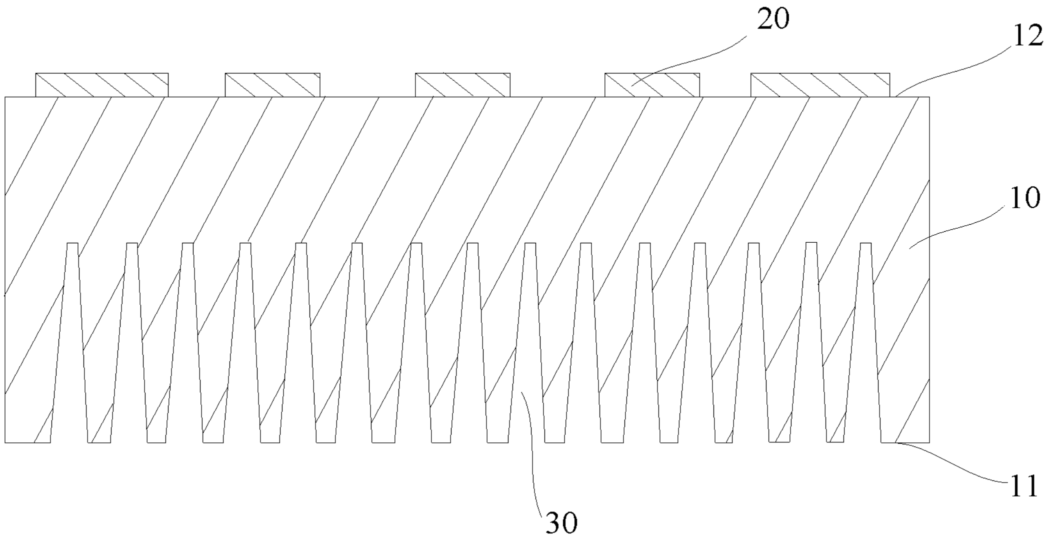
FIG. 6 is a schematic sectional structural diagram of the atomization assembly of another embodiment.

In implementation, the direction where the blind holes 30 shown in FIG. 2 extend from the electronic cigarette liquid absorption surface 11 towards the atomization surface 12 is perpendicular to the electronic cigarette liquid absorption surface 11/the atomization surface 12, which can improve the linear transfer efficiency of the electronic cigarette liquid to the largest extent. In other implementation processes, the extending direction of the blind holes 30 or grooves can also be inclined (as shown in FIG. 5). Further, the electronic cigarette liquid contains a large number of viscous organic components and has higher surface tension, so that during use, when the aperture of the blind holes 30 is smaller, the electronic cigarette liquid is not likely to flow into the blind holes 30 due to the surface tension. Based on this situation, in another implementation mode shown in FIG. 6, the blind hole 30 is shaped to be flared, i.e., the sectional areas of the blind holes 30 gradually decrease in the extending direction of the blind holes 30 from the electronic cigarette liquid absorption surface 11 towards the atomization surface 12, and the electronic cigarette liquid can smoothly infiltrate into the blind holes 30 on the electronic cigarette liquid absorption surface 11 from notches of the blind holes 30.

Meanwhile, in order to enable the structural strength and oil conduction of the porous body to tend to be a best balance. The depth of the above blind holes 30 is less than 0.8 times of a distance from the electronic cigarette liquid absorption surface 11 to the atomization surface 12. The aperture of the blind holes 30 is 50 to 500 μm. Furthermore, the blind holes 30 can be circular, square, and polygonal, and can be of various irregular shapes. In order to guarantee the balance and stability of the electronic cigarette liquid atomization efficiency on the atomization surface 12, the tapping density of the blind holes 30 on the electronic cigarette liquid absorption surface 11 is adjusted by means of setting an appropriate hole pitch. In implementation, the hole pitch between adjacent blind holes 30 is controlled to be 0.1 to 1 mm.

For a tapping density of the blind holes 30 in the electronic cigarette liquid absorption surface 11, in one implementation mode, as shown in FIG. 3, in the embodiment shown in FIG. 3, in order to enable the electronic cigarette liquid that is conducted to the atomization surface 12 in the atomization process to be uniform, absorption for the electronic cigarette liquid on the electronic cigarette liquid absorption surface 11 is also correspondingly uniform. Therefore, in the embodiment of FIG. 3, the blind holes 30 are uniformly arranged. Further, it can be seen from the figure that the blind holes are arranged in a uniform arraying manner.

Figure 7:
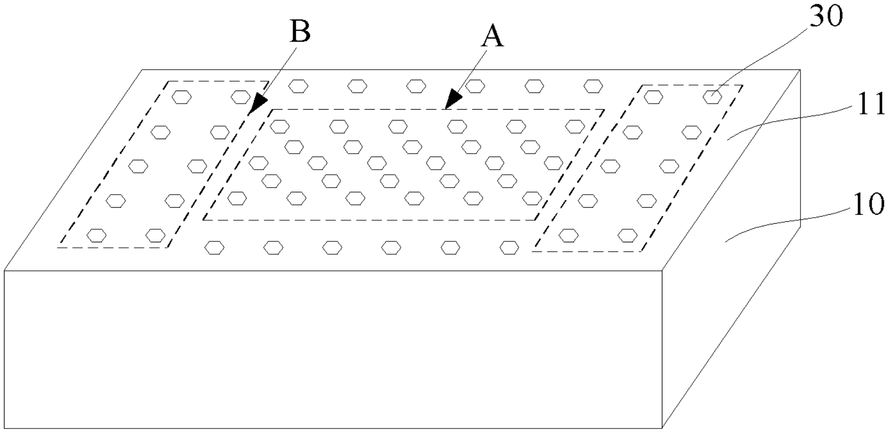
FIG. 7 is a schematic diagram of arrangement of blind holes in an electronic cigarette liquid absorption surface of an atomization assembly of another embodiment.

Compared with the above uniform arrangement manner, the embodiment of FIG. 7 illustrates another more preferred arrangement manner of the blind holes 30. The blind holes 30 are adjusted to have different distribution densities corresponding to different temperature regions according to those regions with concentrated heating temperatures of the heating element 20 on the atomization surface 12. Specifically referring to FIG. 7, the area of the electronic cigarette liquid absorption surface 11 is divided according to a situation corresponding to the heating element 20, so that it includes a region A opposite to the heat generation unit 21 of the heating element 20 and a region B opposite to the electrode connection unit 22. Heating based on the heating element 20 is mainly concentrated at the heat generation unit 21 in the middle, instead of the electrode connection units 22 at the two ends (generally, for the conductive functions of the electrode connection units 22, a copper material with lower resistance is used to prepare electrode pins, and the heat generation unit 21 is made of a nickel/nichrome material with higher resistance based on a heating requirement, so that heat of the heating element 20 is mainly concentrated at the heat generation unit 21); and on the electronic cigarette liquid absorption surface 11, the density of the blind holes 30 in the region A is correspondingly caused to be greater than the density in the region B. By means of this differentiated hole density adjustment, electronic cigarette liquid can be faster supplemented to the heat generation unit 21, thereby improving the atomization efficiency and preventing problems of burning, etc. of the heat generation unit 21.

Figure 8:
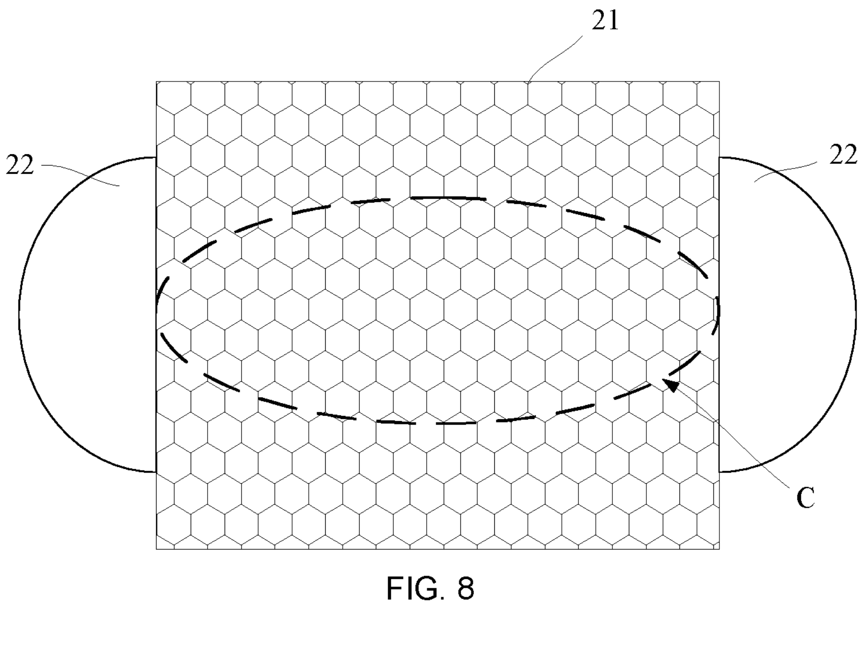
FIG. 8 is a schematic diagram illustrating that a heating element used in one embodiment has a non-uniform temperature during working.
Figure 9:
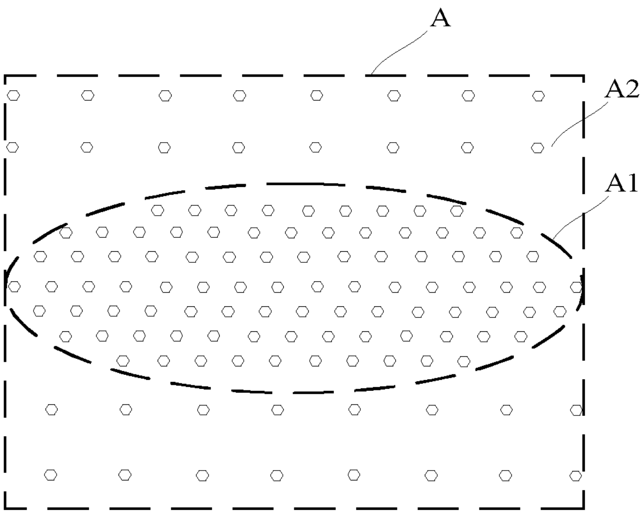
FIG. 9 is a schematic diagram of arrangement of blind holes in an electronic cigarette liquid absorption surface corresponding to the heating element of the embodiment of FIG. 8.

According to the measures of adjusting the hole densities of different corresponding regions on the electronic cigarette liquid absorption surface 11 due to different temperature distributions, the region A can further undergo differentiated hole density design. Specifically, the heating element 20 is illustrated by using the structure of FIG. 8. FIG. 8 illustrates a design of a mostly used mesh heat generation unit 21 that is provided with ear-shaped conductive sheets at two ends as the electrode connection units 22. During use, current has the characteristic of tending to select a shorter path/lower resistance to form a loop, so that heating of various positions of the heat generation unit 21 is not uniform. Specifically, the above selective characteristic of the current enables current of a region C close to a connection line of the two electrode connection units 22 to be higher than current of an edge region, resulting in that the heating temperature of the region C is greater than the heating temperature of the edge region. For this characteristic that causes a temperature imbalance, the tapping density of the region A is correspondingly adjusted. As shown in FIG. 9, the region A is divided into a first sub-region A1 corresponding to the main temperature region C, and a second sub-region A2 located outside the first sub-region A1. Further, during tapping, a density of the blind holes 30 in the first sub-region A1 is greater than a density of the blind holes 30 in the second sub-region A2, so that during use, the supplementation efficiency of the electronic cigarette liquid in the main temperature region C of the heat generation unit 21 is higher; therefore, the smoke efficiency of the atomizer is higher; and the problem of burning in case of poor supplementation of the electronic cigarette liquid can also be prevented.

Figure 4:
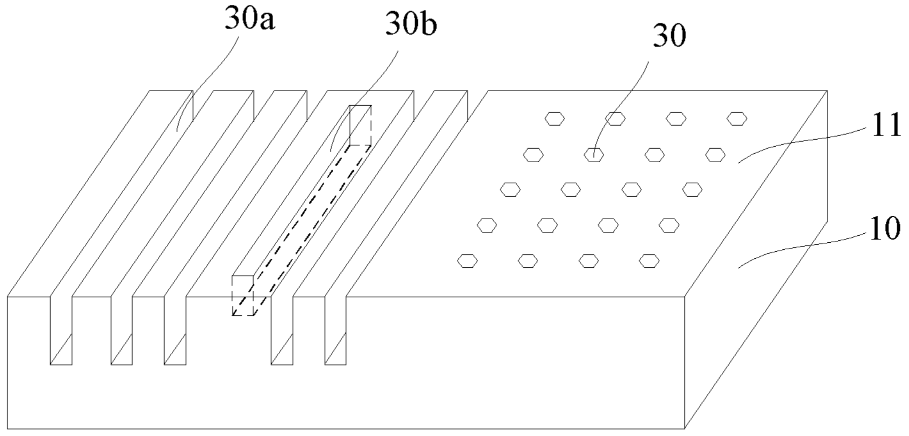
FIG. 4 is a schematic structural diagram of an atomization assembly of another embodiment.

Based on the above-mentioned idea and concept that the functions and the structures of the blind holes 30 are the same, in another embodiment of the present invention, the above manner of tapping the blind holes 30 can be replaced with a slotting manner. Details can refer to FIG. 4. In the embodiment of FIG. 4, a number of blind holes 30 are combined and replaced with a groove structure, so that the electronic cigarette liquid absorption surface 11 has grooves extending from the electronic cigarette liquid absorption surface 11 towards the atomization surface 12. The grooves may be through grooves 30*a* penetrating the front and rear side walls/or countersinks 30*b*. The groove structure can also increase the specific surface area of electronic cigarette liquid absorption, accelerate the linear conduction of the electronic cigarette liquid, and improve the conduction efficiency.

Based on the same content of the depth/arrangement manner of the blind holes 30, in the embodiment of FIG. 4, when grooves are used, the extending depth/arrangement manner of the corresponding grooves can refer to the design of the blind holes 30. Specifically for example, correspondingly, the depth of the grooves is 0.8 times of the distance from the electronic cigarette liquid absorption surface 11 to the atomization surface 12, and the width of the grooves is 50 to 500 μm; meanwhile, the grooves are flared in the extending direction of the grooves, with sectional areas gradually decreasing, so as to promote electronic cigarette liquid infiltration. Moreover, the differentiated groove density design is performed on different temperature regions of the heating element 20, so that electronic cigarette liquid can be supplemented to the regions with high temperatures faster, the atomization efficiency is improved, and burning is prevented.

In the atomization assembly of the embodiment of the present invention, if the electronic cigarette liquid conduction effect of the porous body 10 is improved by the blind holes 30, the porous body 10 can properly lower the parameter requirement of the porous body's pores. The pores contained therein are controlled to have an aperture of 0.1 to 200 μm and a porosity of 0 to 80%, so as to avoid that the porous body is easy to crush and has powder falling if it uses a larger aperture and higher porosity under the structure with the blind holes 30. The porous body 10 can be a porous material such as porous ceramic, porous glass ceramic, porous glass, silicon carbide ceramic, aluminum oxide ceramic, and zirconia ceramic foamed metal. For example, it is of a hard capillary structure such as honeycomb ceramic made of aluminum oxide, silicon carbide or kieselguhr.

The above porous body 10 and the heating element 20 can be respectively obtained and then are fixedly pasted and assembled into a complete atomization assembly according to FIG. 2. Or, in more implementation scenarios and applications, the atomization assembly can also be prepared by means of directly performing sinter molding on the original material of the heating element 20 to the atomization surface 12 of the porous body 10. This sinter molding manner specifically includes: mixing the original material (such as nickel metal powder) of the heating element 20 with a certain amount of sintering aid to prepare mixed slurry; then brushing the mixed slurry to the atomization surface 12 according to the shape shown in the figure to form a printed layer; and burning the printed layer to form the heating element 20 on the porous body 10. Alternatively, the heating element 20 is a heating line provided on the surface of the porous body 10. The heating line includes, but is not limited to, a heating material coating layer, a resistance slurry printing line, etc. The porous body 10 and the heating element 20 are prepared into an integrated structure to prevent the heating element 20 from deforming or being broken to affect the heating performance.

Figure 10:
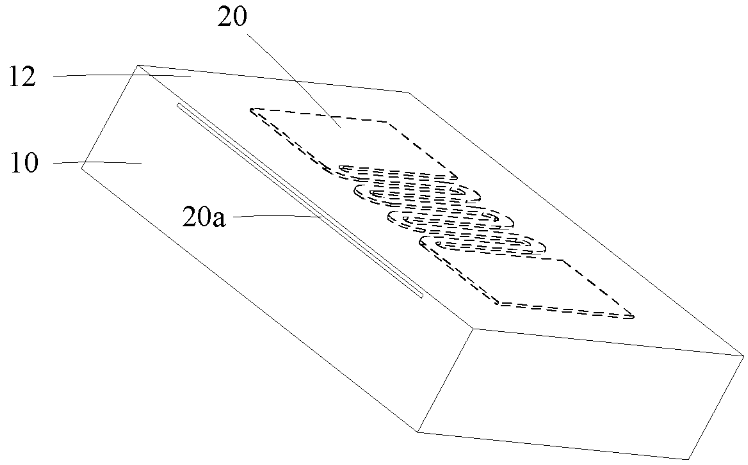
FIG. 10 is a schematic structural diagram of an atomization assembly of yet another embodiment.

Furthermore, in addition to the above surface mounting manner, the heating element 20 can also be mounted in an internal burying manner as shown in FIG. 10. Specifically, in implementation, the heating element 20 that is embedded/buried in the porous body 10 is generated by the above direct sintering manner, or it can also be buried at a position in the porous body 10 close to the atomization surface 12 through a side assembling slot 20*a* in the figure. In this manner, the electronic cigarette liquid can be atomized without being conducted to be in contact with the surface of the heating element 20, but the electronic cigarette liquid starts to be heated and atomized when it gets close to the position of the heating element 20 in the porous body. On the one hand, no burning occurs when the heating element 20 is in thermal contact with the porous body; and on the other hand, most electronic cigarette liquid is not in direct contact with the heating element 20 when atomized, so that metal pollution generated by the fact that the aerosol contains the heating element 20 can be avoided.

In implementation, a material of the heating element 20 can use, but not limited to, silver palladium alloy, stainless steel, nichrome, etc. The thickness is preferably controlled within 1 to 30 μm when a sheet-like structure or printing line is used to form the heating element 20.

Further, the shape of the porous body 10 can also correspondingly change according to different product types. For example, when the shape changes to a hollow cylindrical shape shown in FIG. 11 and FIG. 12, the inner side surface of the porous body is configured to be the atomization surface 12, and the outer surface is configured to be the electronic cigarette liquid absorption surface 11. Therefore, on the outer surface, the above-mentioned blind holes 30 that extend in a radial direction towards the atomization surface 12 are formed in the surface of the electronic cigarette liquid absorption surface 11 by means of mechanical perforating, so as to achieve the effect of improving the contact area and transfer efficiency during electronic cigarette liquid absorption.

Figure 13:
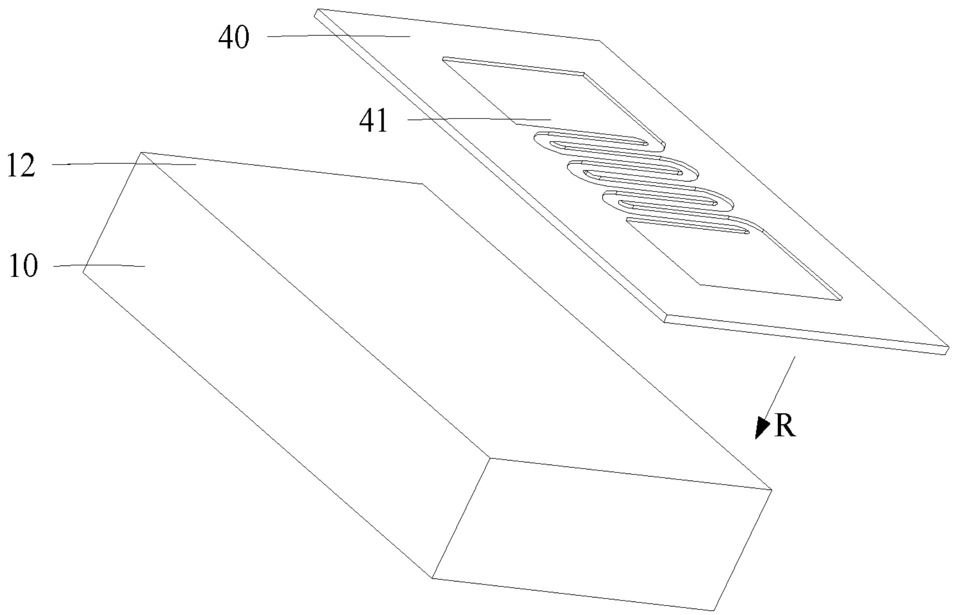
FIG. 13 is a schematic diagram of installation of a hollowed-out template when the atomization assembly of the embodiment of FIG. 1 is installed.

Based on the mass production and preparation quality of the above atomization assembly, the present invention further provides a preparation method for the above atomization assembly. Illustration is made by taking the blocky porous body structure shown in the embodiment of FIG. 1. The method is performed according to the following steps:

S10, a porous body 10 that is of the shape and the structure of FIG. 1 is obtained;

S20, negative pressure is used to fix the porous body 10 shown in FIG. 1 on a table of a laser tapping machine; parameters such as laser energy and light spot size are adjusted according to a designed tapping aperture and tapping depth; laser tapping is performed on a set electronic cigarette liquid absorption surface 11 to form blind holes 30 in the electronic cigarette liquid absorption surface 11;

S21, the porous body 10 tapped at S20 is ultrasonically cleaned in an ultrasonic cleaning machine to wash out residual dust, and the porous body 10 is put into an oven for drying at 60 to 100 degrees for 24 h for standby use;

S30, a heating element 20 is formed on an atomization surface 12 of the porous body 10 in a manner of magnetron sputtering: as shown in FIG. 13, one template 40 provided with hollowed-out patterns 41 matching with the shape of the heating element 20 is pasted on the atomization surface 12 of the porous body 10 along the direction of arrow R in the figure, and then is placed in magnetron sputtering equipment as a receptor;

a target material (such as one of the previously described silver palladium alloy, stainless steel, and nichrome) is placed in the magnetron sputtering equipment; parameters such as sputtering time and power are set to control the magnetron sputtering equipment to work till the thickness of the target material deposited on the receptor of the porous body 10 meets is satisfactory;

finally, the template with the hollowed-out patterns is removed from the receptor of the porous body 10 subjected to sputtering deposition to obtain the final atomization assembly.

Figure 11:
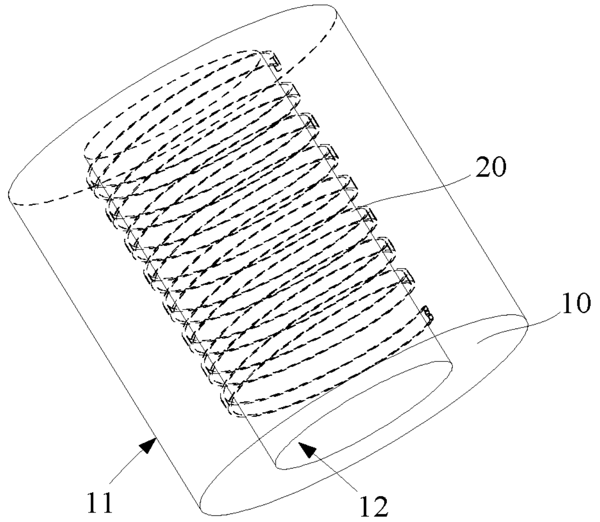
FIG. 11 is a schematic structural diagram of an atomization assembly of a further embodiment.

The above atomization assembly is exemplified by the blocky shape in the embodiment of FIG. 1. When the porous body 10 is of the hollow cylindrical shape shown in FIG. 11, a corresponding operation step is to perform laser tapping/mechanical perforating on the outer surface (i.e., the electronic cigarette liquid absorption surface 11 shown in FIG. 11) to form the blind holes 30, and then one matching barrel-shaped template 40 is mounted on the inner surface (i.e., the atomization surface 12 shown in FIG. 11); similarly, the template 40 needs to have the hollowed-out patterns 41 matching with the shape of the finally deposited heating element 20; and the template is put in the magnetron sputtering equipment as the receptor to deposit and generate a heating material layer on the atomization surface 12 having the template 40; and after the template 40 is removed, the atomization assembly in the embodiment of FIG. 11 is obtained.

Figure 14:
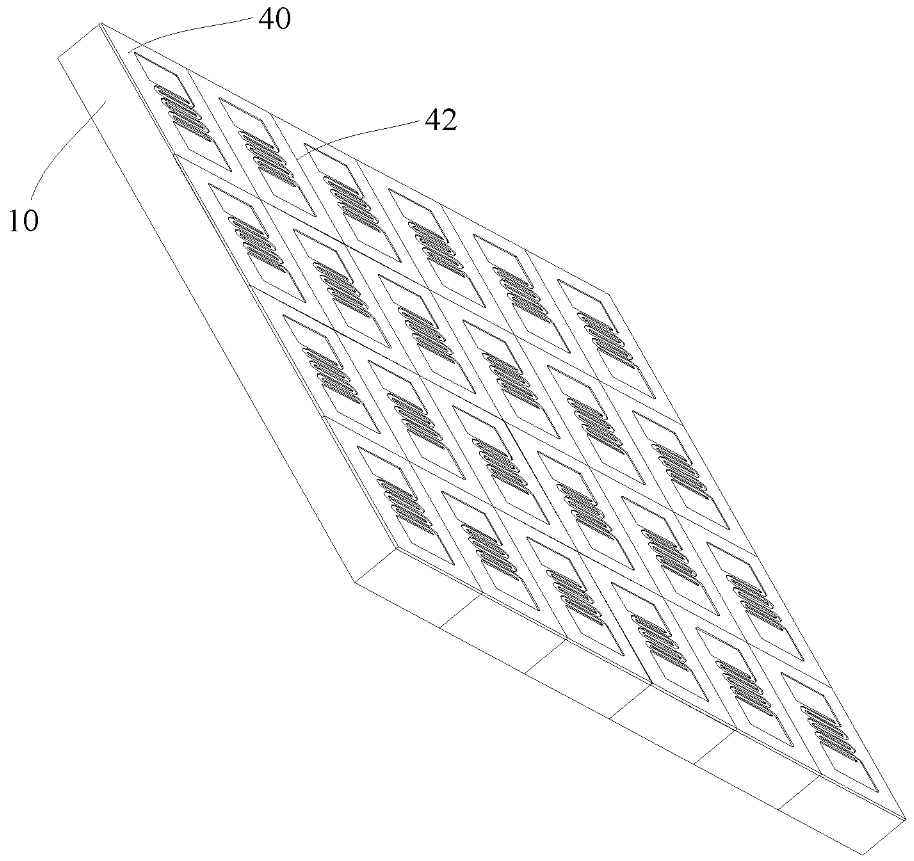
FIG. 14 is a schematic structural diagram of a hollowed-out template when a large number of atomization assemblies are prepared in one embodiment.

The above implemented process can be applicable to preparing a batch of atomization assemblies. In implementation, the magnetron sputtering can also be replaced with cold or hot spraying (for example, by hot spraying, target material powder is heated and melted with electric arc/plasmas, and then is sprayed with a spray gun to the receptor of the porous body 10 provided with the template 40 having the plurality of arrayed hollowed-out patterns 41 shown in FIG. 14), and the heating material layer corresponding to the hollowed-out patterns 41 is generated on the surface of the porous body 10; after completion, the template 40 is removed, and the heating material layer is the heating element; and cutting separation is performed according to cutting lines 42 shown in FIG. 14, thus realizing batch preparation of atomization assemblies at one time.

Compared with a traditional mixing and sintering method, the above preparation method, on the one hand, can ensure that all the prepared atomization assemblies have good electrical performance consistency. Moreover, the problem that it is difficult to realize mass production because a sintering process window for a heating material made of alloy slurry is narrow can be avoided.

Figure 15:
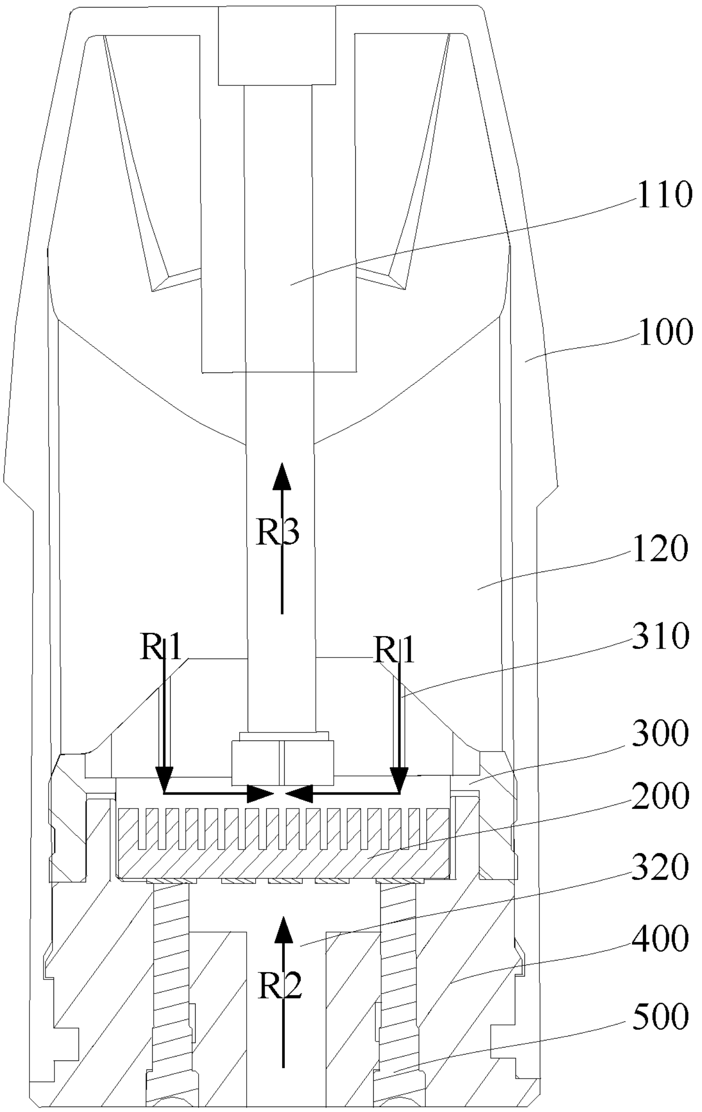
FIG. 15 is a schematic structural diagram of an atomizer of one embodiment.

The present invention further provides an electronic cigarette atomizer comprising the above atomization assembly. The structure of the atomizer can refer to FIG. 15, and includes a hollow outer housing 100 having an opening in the lower end. The outer housing 100 internally has an axial smoke passage 110. It can be further seen from the figure that the lower end of the smoke passage 110 communicates with an atomization chamber 320, and the upper end is used for communicating with a mouthpiece, so that electronic cigarette liquid aerosol generated by the atomization assembly inside is output to the mouthpiece at the upper end of the outer housing 100 for smoking. An electronic cigarette liquid storage chamber 120 for storing electronic cigarette liquid is formed between the outer wall of the smoke passage 110 and the inner wall of the outer housing 100.

A silica gel seat 300 located at the lower end of the electronic cigarette liquid storage chamber 120 is also mounted in the outer housing 100. The silica gel seat 300 is mainly used for closing the electronic cigarette liquid storage chamber 120 to prevent leakage of the electronic cigarette liquid, and can be also used as a carrier for providing a base for mounting an atomization component.

The open end of the outer housing 100 is also provided with an end cover 400, and an atomization chamber 320 is formed between the end cover 400 and the silica gel seat 300. The atomization chamber 320 is configured to be a space for installing the atomization assembly 200 for electronic cigarette liquid atomization. It can be seen from the figure that the atomization assembly 200 in this embodiment uses the atomization assembly shown in the embodiment of FIG. 2. An electronic cigarette liquid conduction hole 310 for conducting the electronic cigarette liquid from the electronic cigarette liquid storage chamber to the atomization assembly 200 is formed in the corresponding silica gel seat 300. One end of the electronic cigarette liquid conduction hole 310 is connected to the electronic cigarette liquid storage chamber 120, and the other end of the electronic cigarette liquid conduction hole is connected to the electronic cigarette liquid absorption surface of the atomization assembly 200. The lower surface of the atomization assembly 200 is an atomization surface provided with a heating element. Moreover, a pair of electrode posts 500 is also mounted on the end cover 400 and respectively serve as positive and negative electrodes that are electrically connected to electrode connection units at two ends of the heating element on the atomization surface, so as to supply power to the heating element.

As shown in FIG. 13, when the atomizer works, the electronic cigarette liquid is transferred from the electronic cigarette liquid storage chamber 120 in the direction of arrow R1 through the electronic cigarette liquid conduction hole 310 to the electronic cigarette liquid absorption surface 11 of the atomization assembly 200, then is further conducted through pores of the porous body to the atomization surface 12 with the heating element 20, and is atomized to generate electronic cigarette liquid aerosol. An air flow circulation process is that a negative pressure generated when a user sucks the mouthpiece at the upper end of the smoke passage 110 drives an external air flow to enter the atomization chamber 320 from the lower end according to the direction of arrow R2 and then enter the smoke passage 110 together with the electronic cigarette liquid aerosol in the atomization chamber 320, and finally, the air flow is output in the direction of arrow R3 to the mouthpiece at the upper end for suction, so as to form a complete air flow circulation.

Figure 12:
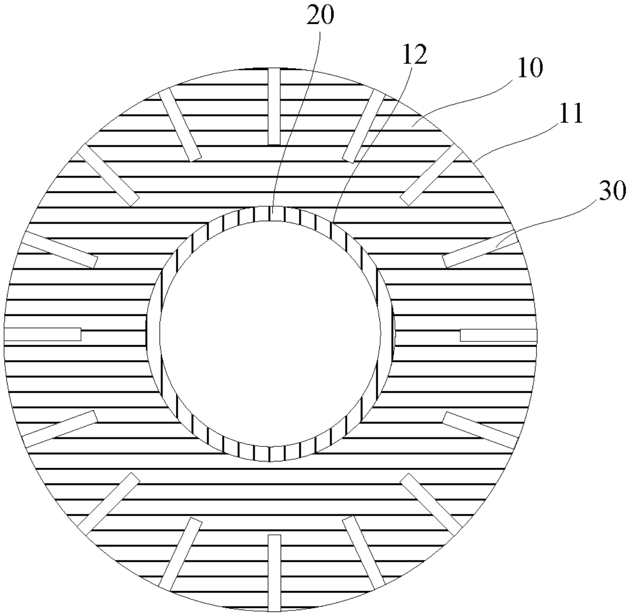
FIG. 12 is a schematic structural diagram of a radial section of the atomization assembly of the embodiment of FIG. 11.

On the basis of FIG. 13, the atomization assembly 200 is replaced with the atomization assembly having the grooves shown in FIG. 4 or the ring-like cylindrical atomization assembly shown in FIG. 11 and FIG. 12 according to a different type of atomizer product. In the same way, the silica gel seat 300 and the electronic cigarette liquid conduction hole 310 are correspondingly reshaped to satisfy desired electronic cigarette liquid conduction and atomization functions.

According to the electronic cigarette atomizer of the present invention, in the atomization assembly, electronic cigarette liquid atomization is performed on the porous body formed with the blind holes and/or grooves by means of laser tapping, mechanical perforating, and other approaches. The porous body has larger specific surface area, which enhances the electronic cigarette liquid adsorption and storage capability and improves the amount of smoke and the smoke efficiency. Moreover, the strength requirement is also achieved, and the service life is longer.

Further, on the basis of the above electronic cigarette atomizer, the present invention further provides an electronic cigarette product. The electronic cigarette product includes an atomization device for atomizing electronic cigarette liquid to generate aerosol, and a power supply device for supplying power to the atomization device. The atomization device uses the above electronic cigarette atomizer. By means of the atomization assembly having the blind holes and/or grooves, the amount of smoke and the smoke efficiency are improved. Moreover, the strength requirement of the atomization assembly is also achieved, and the service life is longer.

It should be noted that the specification of the present invention and the accompanying drawings of the specification illustrate preferred embodiments of the present invention, but do not limited to the embodiments described herein. Further, those of ordinary skill in the art can make improvements or transformations according to the above illustrations, and all these improvements and transformations shall fall within the protection scope of appended claims of the present invention.

The invention claimed is:

1. An electronic cigarette atomizer, comprising an electronic cigarette liquid storage chamber for storing electronic cigarette liquid, and an atomization assembly for absorbing the electronic cigarette liquid from the electronic cigarette liquid storage chamber and atomizing the electronic cigarette liquid, wherein the atomization assembly comprises a porous body for conducting the electronic cigarette liquid, and a heating element for atomizing the electronic cigarette liquid; the porous body comprises an electronic cigarette liquid absorption surface in contact with the electronic cigarette liquid and the porous body further comprises an atomization surface; the heating element is provided on the atomization surface; wherein the electronic cigarette liquid absorption surface is provided with a plurality of blind holes and/or grooves extending along the electronic cigarette liquid absorption surface towards the atomization surface;

wherein the heating element comprises a heat generation unit for generating heat, and an electrode connection unit provided on the heat generation unit; wherein the electronic cigarette liquid absorption surface includes a first electronic cigarette liquid absorption region opposite to the heat generation unit, and a second electronic cigarette liquid absorption region opposite to the electrode connection unit; and density of the blind holes in the first electronic cigarette liquid absorption region is greater than density of the blind holes in the second electronic cigarette liquid absorption region; and or, density of the grooves in the first electronic cigarette liquid absorption region is greater than density of the grooves in the second electronic cigarette liquid absorption region.

2. The electronic cigarette atomizer according to claim 1, wherein an aperture of each blind hole is 50 to 500 μm;

and/or, a width of each groove is 50 to 500 μm.

3. The electronic cigarette atomizer according to claim 1, wherein a depth of each blind hole and/or groove is less than 0.8 times of a distance from the electronic cigarette liquid absorption surface to the atomization surface.

4. The electronic cigarette atomizer according to claim 1, wherein the blind holes and/or the grooves are uniformly arranged in the electronic cigarette liquid absorption surface.

5. The electronic cigarette atomizer according to claim 1, wherein size of sectional area of a blind hole gradually decreases along an extending direction of the blind hole;

and/or, size of sectional area of a groove gradually decreases along an extending direction of the groove.

6. The electronic cigarette atomizer according to claim 4, wherein a hole pitch between adjacent blind holes in the electronic cigarette liquid absorption surface is 0.1 to 1 mm.

7. The electronic cigarette atomizer according to claim 1, wherein a pore aperture of the porous body is 0.1 to 200 μm, with a porosity of 0 to 80%.

8. An electronic cigarette, comprising an atomization device for atomizing electronic cigarette liquid to generate aerosol, and a power supply device for supplying power to the atomizer, wherein the atomization device uses the electronic cigarette atomizer according to claim 1.

9. The electronic cigarette atomizer according to claim 2, wherein a depth of each blind hole and/or groove is less than 0.8 times of a distance from the electronic cigarette liquid absorption surface to the atomization surface.

10. The electronic cigarette atomizer according to claim 2, wherein the heating element comprises a heat generation unit for generating heat, and an electrode connection unit provided on the heat generation unit; wherein the electronic cigarette liquid absorption surface includes a first electronic cigarette liquid absorption region opposite to the heat generation unit, and a second electronic cigarette liquid absorption region opposite to the electrode connection unit;

density of the blind holes in the first electronic cigarette liquid absorption region is greater than density of the blind holes in the second electronic cigarette liquid absorption region; and/or, density of the grooves in the first electronic cigarette liquid absorption region is greater than density of the grooves in the second electronic cigarette liquid absorption region.

11. The electronic cigarette atomizer according to claim 2, wherein the blind holes and/or the grooves are uniformly arranged in the electronic cigarette liquid absorption surface.

12. The electronic cigarette atomizer according to claim 2, wherein size of sectional area of a blind hole gradually decreases along an extending direction of the blind hole;

and/or, size of sectional area of a groove gradually decreases along an extending direction of the groove.

13. The electronic cigarette atomizer according to claim 11, wherein a hole pitch between adjacent blind holes in the electronic cigarette liquid absorption surface is 0.1 to 1 mm.

14. The electronic cigarette atomizer according to claim 2, wherein a pore aperture of the porous body is 0.1 to 200 μm, with a porosity of 0 to 80%.

15. The electronic cigarette according to claim 8, wherein an aperture of each blind hole is 50 to 500 μm;

and/or, a width of each groove is 50 to 500 μm.

16. The electronic cigarette according to claim 8, wherein a depth of each blind hole and/or groove is less than 0.8 times of a distance from the electronic cigarette liquid absorption surface to the atomization surface.

17. The electronic cigarette according to claim 8, wherein the heating element comprises a heat generation unit for generating heat, and an electrode connection unit provided on the heat generation unit; wherein the electronic cigarette liquid absorption surface includes a first electronic cigarette liquid absorption region opposite to the heat generation unit, and a second electronic cigarette liquid absorption region opposite to the electrode connection unit; and density of the blind holes in the first electronic cigarette liquid absorption region is greater than density of the blind holes in the second electronic cigarette liquid absorption region; and/or, density of the grooves in the first electronic cigarette liquid absorption region is greater than density of the grooves in the second electronic cigarette liquid absorption region.

18. The electronic cigarette according to claim 8, wherein the blind holes and/or the grooves are uniformly arranged in the electronic cigarette liquid absorption surface.

19. The electronic cigarette according to claim 8, wherein size of sectional area of a blind hole gradually decreases along an extending direction of the blind hole;

and/or, size of sectional area of a groove gradually decreases along an extending direction of the groove.

* * * * *